United States Patent
Huang et al.

(10) Patent No.: US 11,385,586 B2
(45) Date of Patent: Jul. 12, 2022

(54) MISSING BAND DETECTION

(71) Applicants: Hewlett-Packard Development Company, L.P., Spring, TX (US); Purdue Research Foundation, West Lafayette, IN (US)

(72) Inventors: Wan-Eih Huang, West Lafayette, IN (US); Jan Allebach, Boise, ID (US); Richard Eric Maggard, Boise, ID (US); Renee Jeanette Jessome, Boise, ID (US); Mark Quentin Shaw, Boise, ID (US)

(73) Assignees: Hewlett-Packard Development Company, L.P., Spring, TX (US); Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/258,475

(22) PCT Filed: Feb. 7, 2019

(86) PCT No.: PCT/US2019/017035
§ 371 (c)(1),
(2) Date: Jan. 7, 2021

(87) PCT Pub. No.: WO2020/162939
PCT Pub. Date: Aug. 13, 2020

(65) Prior Publication Data
US 2021/0356893 A1     Nov. 18, 2021

(51) Int. Cl.
*G03G 15/00* (2006.01)

(52) U.S. Cl.
CPC ..... *G03G 15/5058* (2013.01); *G03G 15/5037* (2013.01); *G03G 15/5062* (2013.01); *G03G 15/55* (2013.01)

(58) Field of Classification Search
USPC .......................................................... 399/49
See application file for complete search history.

(56) References Cited

U.S. PATENT DOCUMENTS

| | | | |
|---|---|---|---|
| 7,058,325 B2 * | 6/2006 | Hamby | G03G 15/5062 399/49 |
| 7,755,799 B2 | 7/2010 | Paul et al. | |
| 7,911,652 B2 | 3/2011 | Goodman et al. | |
| 8,077,359 B2 | 12/2011 | Kishi et al. | |
| 8,565,628 B2 | 10/2013 | Henderson | |

(Continued)

OTHER PUBLICATIONS

J. Zhang, et al., Assessment of presence of isolated periodic and aperiodic bands in laser electrophotographic printer output, SPIE, vol. 8653, pp. 86530N-1-86530N-7, 2013.

(Continued)

*Primary Examiner* — Quana Grainger
(74) *Attorney, Agent, or Firm* — Austin Rapp

(57) ABSTRACT

Examples of methods are described herein. In some examples, a method includes calculating a first cost function measure based on band defects in an image. In some examples, the method also includes calculating a second cost function measure based on the band defects and a synthetic band. In some examples, the method further includes detecting a missing band based on a comparison of the first cost function measure and the second cost function measure.

15 Claims, 4 Drawing Sheets

(56) References Cited

U.S. PATENT DOCUMENTS

2009/0002724 A1  1/2009 Paul et al.
2012/0237087 A1  9/2012 Wu et al.
2013/0242292 A1  9/2013 Kida et al.

OTHER PUBLICATIONS

J. Zhang, et al., Estimation of repetitive interval of periodic bands in laser electrophotographic printer output, vol. 9396, pp. 93960J-1-93960J-9, 2015.

J. Zhang, et al., Psychophysical evaluation of banding visibility in the presence of print content, vol. 8293, pp. 82930S-1-82930S-10, 2012.

* cited by examiner

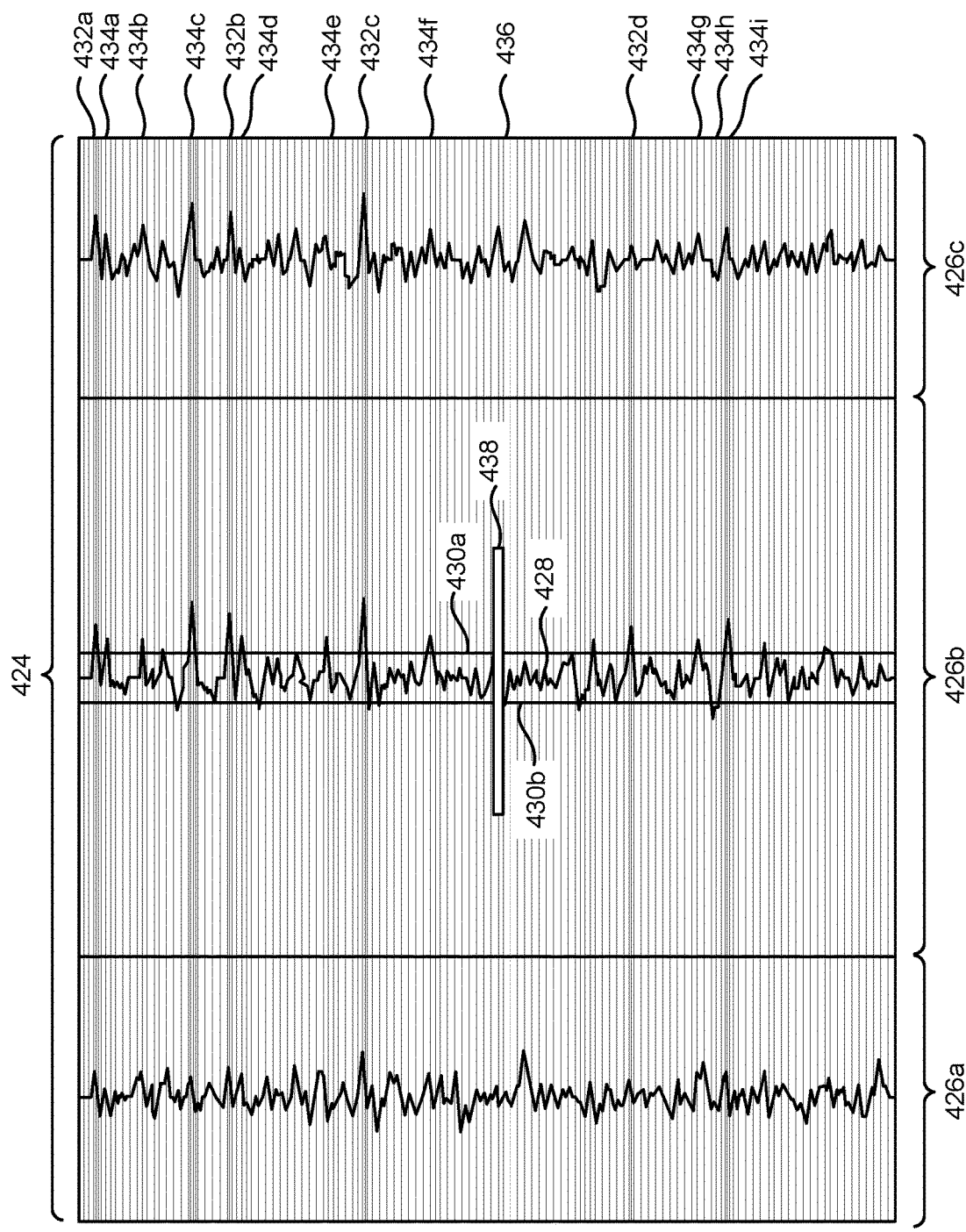

MISSING BAND DETECTION

BACKGROUND

Devices can fail or operate poorly over time. For instance, device components may wear down or may be manufactured with defects that cause poor operation. In some cases, devices can be configured improperly or may be improperly maintained, which can lead to poor operation. Device failure or poor operation can incur costs.

BRIEF DESCRIPTION OF THE DRAWINGS

FIG. 4 is a diagram of an illustrative example of an image of a printed page with band defects.

DETAILED DESCRIPTION

Figure 1:
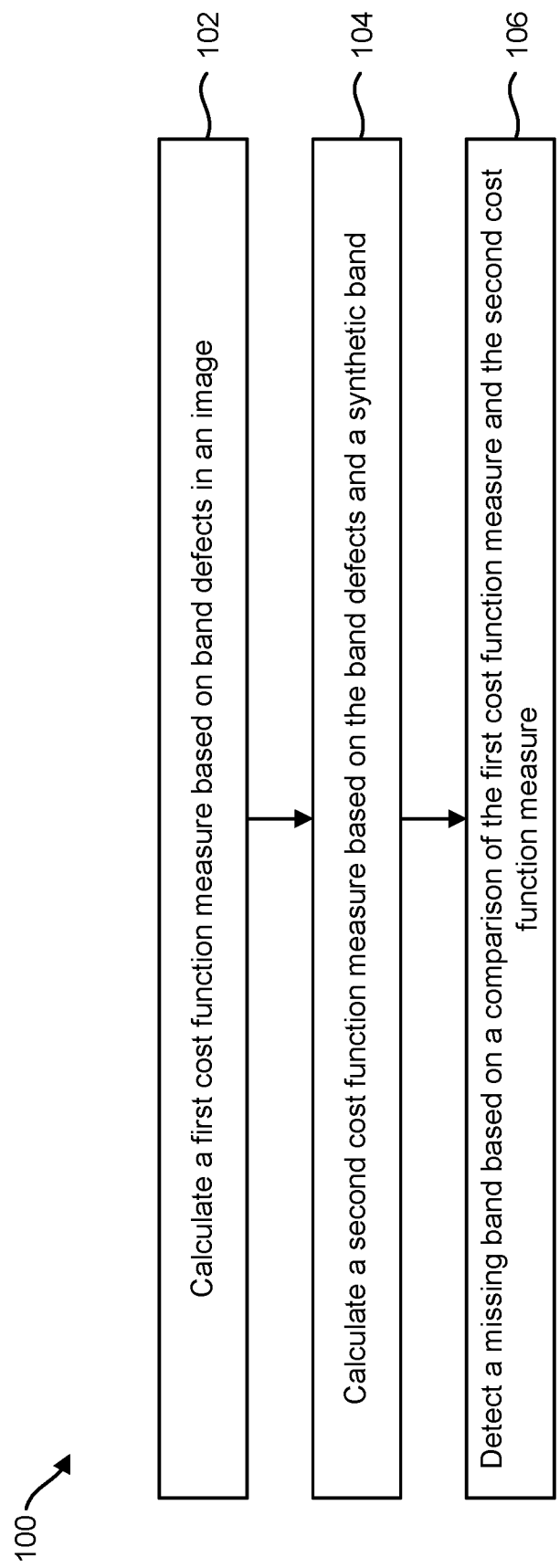
FIG. 1 is a flow diagram illustrating an example of a method for detecting a missing band.

The techniques described herein relate to missing band detection. As used herein, a "band" or "band defect" is a defect that arises in printed materials. A band defect may appear as a band or stripe in printed material. For example, a band defect may be lighter or darker than nearby content of the same color. Band defects may be periodic (where repeated bands occur at approximately regular intervals) or aperiodic (where a band or bands may occur without a regular interval).

The interval of periodic band defects may be a useful in print quality assessment. For example, an impairment (e.g., irregularity) localized in the circumference of the surface of a rotating component may cause the periodic band defects in the output of a printer. Accordingly, the interval may be used to diagnose the cause of the band defects.

A cost function approach may be utilized to determine the interval on less noisy outputs (e.g., printed pages). However, if an output contains more aperiodic bands and noise, accurate interval estimation is a challenge. One difficulty in accurately estimating the interval is the occurrence of a missing band or bands. A missing band is a band defect that is not detected in band detection. For example, a missing band may be missing from a set of periodic band defects. Having a missing band or bands may decrease the probability of correct interval determination.

Some examples of the techniques described herein may estimate the interval based on repetitive cost function evaluation. For example, a cost function may be evaluated and then re-evaluated with the addition of a synthetic band to determine whether the re-evaluated cost function has a better result. Evaluating and re-evaluating the cost function and comparing cost function results may improve the accuracy of interval determination. In turn, increased interval determination accuracy may improve impaired device component identification.

Throughout the drawings, identical reference numbers may designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

FIG. 1 is a flow diagram illustrating an example of a method 100 for detecting a missing band. The method 100 and/or a method 100 element or elements may be performed by an apparatus (e.g., electronic device, printer, computer, etc.). For example, the method 100 may be performed by the apparatus 202 described in connection with FIG. 2.

In some examples, a printer (e.g., electrophotographic (EP) printer) may produce a printed page. The printed page may be a test page or other page. An image (e.g., digital image) of the printed page may be captured. For example, the apparatus, a printer, or another device may include an image sensor that may be utilized to capture the image of the printed page.

Band defects may be detected in the image. A band defect may be indicated by a position or position range along a dimension of the image or printed page. For example, one dimension along which a print head travels may be referred to as a scan dimension (e.g., x dimension), while another dimension in which paper travels may be referred to as a process dimension (e.g., y dimension). A band defect may be indicated as a position or position range along the process dimension.

A variety of techniques may be utilized to detect band defects. While some examples of techniques for detecting band defects are described herein, other techniques may be utilized. In some examples, band detection may include pre-processing, profile extraction, and band identification. Pre-processing may include de-screening the image to remove halftone patterns, masking (e.g., removing a portion or portions of the image from consideration, such as non-printable areas, fiducial markers, confidential information, and/or text, etc.), and/or partitioning (e.g., dividing the image into multiple regions for separate analysis). In some examples, partitioning may be performed in order to localize band defects, since band defects may fade along a scan dimension.

Profile extraction may include color space conversion, projection, and/or baseline removal. In some examples, operations may be performed on the original color space of the image, or the color space of the image may be converted. In some examples, projection may include projecting a two-dimensional (2D) image into one dimension (1D). For example, the projection may include calculating an average or mean value (along the scan dimension, for instance) of each line of pixels or pixel components (e.g., $L^*$, $a^*$, and $b^*$ components in the Commission on Illumination $L^*a^*b^*$ (CIELAB) color space, or components in another color space) of the image. Baseline removal may include determining a baseline by filtering the 1D projection data to determine baseline values and subtracting the resulting baseline values from the 1D projection data. For example, difference values may be calculated between the 1D projected components and corresponding baseline values. In some examples, the profile may be the square root of a sum of squared difference values. The profile may be combined with a sign of a difference value of a lightness (e.g., $L^*$) component, which may indicate whether the profile (at each scan line, for example) is lighter or darker than the background or baseline.

In some examples, band identification may be based on a threshold or thresholds. For example, a statistical distribution of the profile may be utilized to determine the threshold. In some examples, the threshold may be one standard deviation from the mean of the profile (or thresholds may be one standard deviation from the mean in both directions). The profile may include peaks that are beyond the threshold (s). For example, peak values may be values of the profile that are beyond the threshold. Features of the peaks may be determined and/or extracted. Examples of peak features may include whether a peak is light or dark, center position, height, width, area, and sharpness (e.g., transition width).

In some examples, band defects may be identified by peak values. For example, band defects may be identified where peak values in the profile occur. In some examples, peak values may be classified as visible or invisible, where visible peaks may be selected as indicating a band defect. It may be beneficial to classify peaks as visible or invisible to reduce false band identification positives and/or to improve estimation of periodic bands. For example, a classification model may be utilized to predict the probability of whether a peak is visible or invisible, where visible peaks indicate band defects. For instance, the classification model may be based on a logistic regression. The classification model may be a weighting function that predicts the probability of whether a peak is visible or invisible. In some examples, a peak feature or features may be utilized. For example, peak height (e.g., a maximum for peak values beyond the threshold), minimum sharpness, and width may be utilized in the logistic regression for the model. The model may then be applied to determine whether a band defect is identified based on a peak.

A set or sets of periodic bands may be determined based on the band defects. A variety of techniques may be utilized to determine a set or sets of periodic bands. While some examples of techniques for determining a set or sets of periodic bands are described herein, other techniques may be utilized. In some examples, the band profile, where a band defect is light or dark, and a center position of each band may be utilized to determine the set or sets of periodic bands.

In some examples, the total strength of light bands and the total strength of dark bands may be utilized to determine prospective periodic band defects. For example, the total strength of light bands may be a sum of the profile values corresponding to the light bands and a total strength of dark bands may be a sum of the profile values corresponding to the dark bands. The total strength of the light bands may be compared to the total strength of the dark bands, where the bands corresponding to the larger total strength may be selected as prospective periodic band defects. A prospective periodic band defect is a band defect that is potentially an actual periodic band defect (or potentially an aperiodic band defect, for example). In some examples, the method 100 may include determining a set or sets of prospective periodic band defects. For example, the apparatus may determine sets of prospective periodic band defects as combinations of the prospective periodic band defects. For instance, each set of prospective periodic band defects may be expressed as a membership vector that indicates whether each of the prospective periodic band defects is included in a set of prospective periodic band defects.

The apparatus may calculate 102 a first cost function measure based on band defects in an image. A cost function measure is a measure that is based on a cost function. As described herein, a cost function is a function that provides an indication of whether a band defect is a probable member of a set of periodic band defects. One example of a cost function is a function defined by a mean squared error between a set of prospective periodic band defects and a set of band defects. Other cost functions may be utilized. Examples of cost function measures include a cost function value and a fitting error. The cost function value is the value of the cost function. The fitting error is a normalized cost function value to an interval. More detail is given in connection with FIG. 3. Calculating 102 the first cost function measure may include calculating the cost function value and/or the fitting error for a set of prospective periodic band defects.

The apparatus may calculate 104 a second cost function measure based on the band defects and a synthetic band. For example, the apparatus may insert a synthetic band into a set of band defects (e.g., prospective periodic band defects) and calculate 104 the second cost function measure (e.g., cost function value and/or fitting error) for the set of band defects with the synthetic band. For instance, the apparatus may determine that a band defect exists at two intervals away from a set of prospective periodic band defects. In response to determining that a band defect exists at two intervals away from the set of prospective periodic band defects, the apparatus may insert a synthetic band at a position that is an interval from the set of prospective periodic band defects (e.g., approximately halfway between the prospective periodic band defect and the band defect). The apparatus may calculate 104 the second cost function measure based on the set of prospective periodic band defects with the synthetic band.

The apparatus may detect 106 a missing band based on a comparison of the first cost function measure and the second cost function measure. For example, the apparatus may compare the first cost function measure (e.g., the cost function measure calculated based on the set of prospective periodic band defects) and the second cost function measure (e.g., the cost function measure calculated based on the set of prospective periodic band defects with the synthetic band). The comparison may indicate whether a missing band is detected at the position of the synthetic band. For example, a missing band may be detected in response to determining that the second cost function measure is less than the first cost function measure.

In some examples, the method 100 may include determining an impaired device component based on the missing band. For example, in a case that the missing band is a band defect in a set of actual periodic band defects, the interval between band defects may be utilized to determine an impaired device component. In some examples, the image is an image of a printed page produced by a printer and the impaired device component is a component of the printer. Determining the impaired device component may be based on an interval between one of the band defects and the missing band. For example, the interval between one of the periodic band defects and the missing band may correspond to a circumference of the impaired device component. For example, determining the impaired device component may include determining a device component corresponding to the interval. In some examples, the apparatus may compare the interval with a set of circumferences of a set of components (e.g., rollers) of the printer. The apparatus may select the device component with a circumference that is nearest to the interval. For example, the apparatus may utilize a look up table to map the interval to the impaired device component. In another example, the apparatus may determine differences between the interval and the circumferences of a set of components, where a minimum difference may indicate the impaired device component. Examples of device components may include rollers, fusers, intermediate transfer belts, organic photoconductors, etc.

In some examples, the method 100 may include initiating a corrective action based on the missing band. For example, initiating the corrective action may include indicating an impaired device component. Indicating the impaired device component may include presenting a message on a display that indicates the impaired device component, sending a message (e.g., email, text, alert, packet, signal, etc.) to another device that indicates the impaired device component. In some examples, initiating corrective action may include performing an action to remedy the impaired device component. For instance, a printer may initiate a roller cleaning procedure to remedy the impaired device component. In some examples, initiating the corrective action may include sending instructions to a service provider (e.g., service technician) indicating that a device component is impaired and needs maintenance (e.g., servicing or replacement). In some examples, the instructions may indicate the nature of the impaired component (e.g., a part that is impaired) and/or the type of maintenance that needs to be performed (e.g., parts need to be replaced, cleaned, lubricated, reconfigured, etc.). In some examples, initiating the corrective action may include scheduling maintenance (e.g., requesting a time for maintenance from an owner of the device with the impaired component). Other corrective actions may be initiated in other examples.

Figure 2:
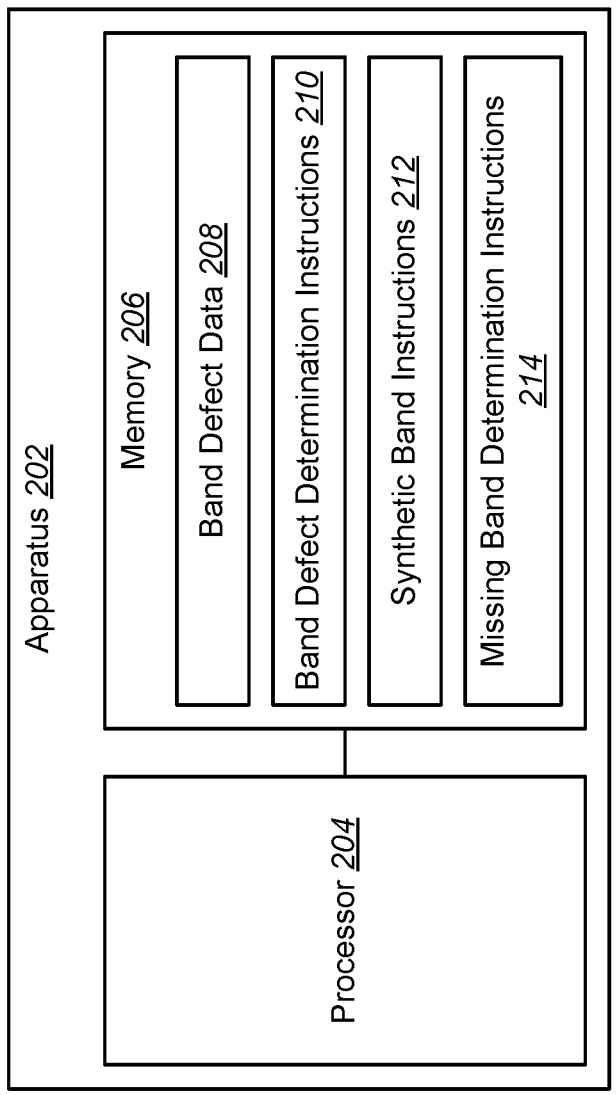
FIG. 2 is a block diagram of an example of an apparatus that may be used in missing band detection.

FIG. 2 is a block diagram of an example of an apparatus 202 that may be used in missing band detection. The apparatus 202 may be an electronic device, such as a personal computer, a server computer, a printer, a smartphone, a tablet computer, etc. The apparatus 202 may include and/or may be coupled to a processor 204 and/or a memory 206. In some examples, the apparatus 202 may include a display and/or an input/output interface. In some examples, the apparatus 202 may be in communication with (e.g., coupled to, have a communication link with) a printer. Alternatively, the apparatus 202 may be an example of a printer. The apparatus 202 may include additional components (not shown) and/or some of the components described herein may be removed and/or modified without departing from the scope of this disclosure.

The processor 204 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 206. The processor 204 may fetch, decode, and/or execute instructions (e.g., band defect determination instructions 210, synthetic band instructions 212, and/or missing band determination instructions 214) stored in the memory 206. Additionally or alternatively, the processor 204 may include an electronic circuit or circuits that include electronic components for performing a function or functions of the instructions (e.g., band defect determination instructions 210, synthetic band instructions 212, and/or missing band determination instructions 214). In some examples, the processor 204 may perform one, some, or all of the functions, operations, elements, methods, etc., described in connection with one, some, or all of FIGS. 1-4.

The memory 206 may be any electronic, magnetic, optical, or other physical storage device that contains or stores electronic information (e.g., instructions and/or data). The memory 206 may be, for example, Random Access Memory (RAM), Electrically Erasable Programmable Read-Only Memory (EEPROM), a storage device, an optical disc, and the like. In some examples, the memory 206 may be volatile and/or non-volatile memory, such as Dynamic Random Access Memory (DRAM), EEPROM, magnetoresistive random-access memory (MRAM), phase change RAM (PCRAM), memristor, flash memory, and the like. In some implementations, the memory 206 may be a non-transitory tangible machine-readable storage medium, where the term "non-transitory" does not encompass transitory propagating signals. In some examples, the memory 206 may include multiple devices (e.g., a RAM card and a solid-state drive (SSD)).

In some examples, the apparatus 202 may include an input/output interface through which the processor 204 may communicate with an external device or devices (not shown), for instance, to receive and store information (e.g., band defect data 208) pertaining to an object or objects to be manufactured (e.g., printed). The input/output interface may include hardware and/or machine-readable instructions to enable the processor 204 to communicate with the external device or devices. The input/output interface may enable a wired or wireless connection to the external device or devices (e.g., printer or printers). The input/output interface may further include a network interface card and/or may also include hardware and/or machine-readable instructions to enable the processor 204 to communicate with various input and/or output devices, such as a keyboard, a mouse, a display, a touchscreen, a microphone, a controller, another apparatus, electronic device, computing device, etc., through which a user may input instructions into the apparatus 202.

In some examples, the memory 206 may store band defect data 208. The band defect data 208 may be obtained (e.g., received) from an external device and/or may be generated on the apparatus 202. For example, the processor 204 may execute instructions (not shown in FIG. 2) to receive the band defect data 208 from an external device (e.g., printer). In another example, the processor 204 may generate the band defect data 208 based on image analysis as described in connection with FIG. 1.

The band defect data 208 may include data indicating a characteristic or characteristics pertaining to band defects (e.g., detected band defects, prospective periodic band defects, periodic band defects, synthetic bands, missing band defects, etc.). For example, the band defect data 208 may indicate band defect positions (e.g., center position and/or range), whether band defects are light or dark, peak features corresponding to band defects (e.g., whether a peak is light or dark, center position, height, width, area, and/or sharpness (e.g., transition width), band profile, etc.

In some examples, the processor 204 may execute the band defect determination instructions 210 to determine a set of periodic band defects based on a first cost function estimation. For example, determining the set of periodic band defects may be accomplished as described in connection with FIG. 1.

In some examples, the processor 204 may execute the synthetic band instructions 212 to insert a synthetic band in a case that there is a detect band defect at an interval multiple from the set of periodic band defects. For example, the processor 204 may determine an interval from the set of periodic band defects (e.g., prospective periodic band defects) as an interval (e.g., a distance in length such as centimeters, inches, or pixels) between two bands. From an end periodic band defect, the processor may add two times the interval distance to determine a position and determine whether the band defect data 208 indicates a band defect within a range from the position. If there is a band defect within the range from the position, the processor 204 may insert a synthetic band at a position that is one interval from the end periodic band (between the end periodic band defect and the detected band defect that is two intervals from the end periodic band defect).

In some examples, the processor 204 may execute the missing band determination instructions 214 to determine that there is a missing band corresponding to the synthetic band based on a second cost function estimation. For example, the processor 204 may compare a first cost function measure from the first cost function estimation with a second cost function measure from the second cost function estimation (that is based on the inserted synthetic band) to determine whether there is a missing band corresponding to the synthetic band.

In some examples, the processor 204 may calculate a first fitting error from the first cost function estimation and may calculate a second fitting error from the second cost function estimation. The processor 204 may compare the first fitting error to the second fitting error. The processor 204 may determine that there is a missing band in a case that the second fitting error is less than the first fitting error.

In some examples, the processor 204 may identify a device component that caused the periodic band defects. For example, the processor 204 may utilize the interval corresponding to the set of periodic band defects to determine a device component from a set of device components that caused the periodic band defects. For example, the interval may be characteristic of the device component (e.g., roller, fuser, intermediate transfer belt, organic photoconductor, etc.) that has caused the periodic band defects. The processor 204 may determine the device component corresponding to the set of periodic band defects.

In some examples, the processor 204 may initiate a corrective action based on the missing band. This may be accomplished as described in connection with FIG. 1. For instance, the processor 204 may indicate an impaired device component by presenting a message on a display that indicates the impaired device component, may send a message (e.g., email, text, alert, packet, signal, etc.) to another device that indicates the impaired device component, may perform an action to remedy the impaired device component, and/or may send instructions to a service provider. In some examples, the indication(s), message(s), and/or instruction(s) may be send via and input/output interface included in the apparatus 202.

Figure 3:
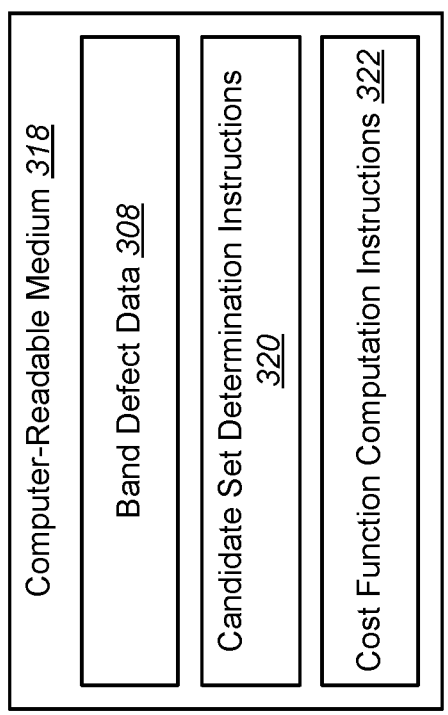
FIG. 3 is a block diagram illustrating an example of a computer-readable medium for missing band detection.

FIG. 3 is a block diagram illustrating an example of a computer-readable medium 318 for missing band detection. The computer-readable medium is a non-transitory, tangible computer-readable medium 318. The computer-readable medium 318 may be, for example, RAM, EEPROM, a storage device, an optical disc, and the like. In some examples, the computer-readable medium 318 may be volatile and/or non-volatile memory, such as DRAM, EEPROM, MRAM, PCRAM, memristor, flash memory, and the like. In some implementations, the memory 206 described in connection with FIG. 2 may be an example of the computer-readable medium 318 described in connection with FIG. 3.

The computer-readable medium 318 may include code (e.g., data and/or instructions). For example, the computer-readable medium 318 may include band defect data 308, candidate set determination instructions 320, and/or cost function computation instructions 322.

The band defect data 308 may include information pertaining to band defects (e.g., position, profile, characteristics, etc.). For example, the band defect data 308 may be similar to the band defect data 208 described in connection with FIG. 2.

In some examples, the cost function computation instructions 322 are code to cause the processor to perform cost function computation instructions. The cost function may be computed in order to determine candidate sets of periodic band defects. While a specific example of a cost function computation is given as follows, other cost function computations may be performed in accordance with the techniques disclosed herein.

Positions of prospective periodic band defects may be denoted as given in Equation (1).

$$\vec{b} = [b_1, b_2, \ldots, b_N] \quad (1)$$

In Equation (1), N denotes a total number of prospective band defects and b1, b2, etc., denote the positions of the prospective periodic band defects.

In some examples, a membership vector may be defined as given in Equation (2).

$$\vec{m} = [m_1, m_2, \ldots, m_N], m_i = \begin{cases} 1, & \text{periodic} \\ 0, & \text{aperiodic} \end{cases} \quad i = 1, 2, \ldots, N \quad (2)$$

Two variables of the cost function may include o, which is a position of a first band, and $\Delta b$, which is an interval between periodic band defects. Accordingly, predicted positions of periodic band defects may be expressed as given in Equation (3).

$$b'_k = o + (k-1)\Delta b, k = 1, \ldots, p \quad (3)$$

In Equation (2), p is a number of periodic bands.

An example of the cost function is given in Equation (4) as follows.

$$\phi = \frac{1}{p} \sum_{i=1}^{N} m_i \left( o + \Delta b \left( \sum_{j=1}^{i} m_j - 1 \right) b_i \right)^2 \quad (4)$$

Equation (5) is an example of an approach to solve for the position of the first band ($\hat{o}^{(\vec{m})}$) with a membership vector $\vec{m}$.

$$\hat{o}^{(\vec{m})} = \frac{2(2p-1)}{p(p+1)} \sum_{i=1}^{N} m_i b_i - \frac{6}{p(p+1)} \sum_{i=1}^{N} \left( \sum_{j=1}^{i} m_j - 1 \right) m_i b_i \quad (5)$$

Equation (6) is an example of an approach to solve for the interval ($\Delta \hat{b}^{(\vec{m})}$) with a membership vector $\vec{m}$.

$$\Delta \hat{b}^{(\vec{m})} = \frac{12}{p(p+1)(p-1)} \sum_{i=1}^{N} m_i \left( \sum_{j=1}^{i} m_j - 1 \right) b_i - \frac{6}{p(p+1)} \sum_{i=1}^{N} m_i b_i \quad (6)$$

In order to find a solution, an exhaustive search with p and $\vec{m}$ may be performed. For example, and initial value of p may be predetermined, and there may be $$\binom{N}{p}$$

possible combinations of the membership vector $\vec{m}$. Equation (7) illustrates an example of an approach to find a cost function value for a membership vector ($\phi^{(\vec{m})}$) with the position of the first band ($\hat{o}^{(\vec{m})}$) and the interval ($\Delta \hat{b}^{(\vec{m})}$).

$$\phi^{(\vec{m})} = \frac{1}{p} \sum_{i=1}^{N} m_i \left( \hat{o}^{(\vec{m})} + \Delta \hat{b}^{(\vec{m})} \left( \sum_{j=1}^{i} m_j - 1 \right) - b_i \right)^2 \quad (7)$$

In some examples, an initial value of p (e.g., 3) may be set. Given p, $$\binom{N}{p}$$

possible combinations of the membership vector $\vec{m}$ may be determined. For each $\vec{m}$, the position of the first band ($\hat{o}^{(\vec{m})}$), the interval ($\Delta \hat{b}^{(\vec{m})}$), and the cost function value ($\phi^{(\vec{m})}$) may be calculated. A minimum cost function value ($\phi_p$) of the cost function values ($\phi^{(\vec{m})}$) may be determined, where a corresponding interval ($\Delta \hat{b}_p$) and a corresponding membership vector $\vec{m}_p$ may be stored (as band defect data 308, for example). The value of p may be incremented, and the cost function calculation may be performed for each p up to where p is equal to N.

In some examples, a fitting error $\varepsilon_p$ may be calculated for each of the minimum cost function values ($\phi_p$) for each p. An example of the fitting error is given in Equation (8).

$$\varepsilon_p = \frac{1}{\Delta \hat{b}_p} \sqrt{\phi_p} \quad (8)$$

In some examples, the candidate set determination instructions 320 are code to cause a processor to determine candidate sets of periodic band defects from a set of band defects in an image based on respective first cost function computations. For example, the processor may execute the candidate set determination instructions 320 to select sets of periodic band defects that have less than a threshold fitting error. In some examples, the threshold fitting error may be 5%.

In some examples, it may be determined whether there is a band defect approximately $2\Delta \hat{b}_p$ away from the end of each candidate set of periodic band defects. If there is not a band defect approximately $2\Delta \hat{b}_p$ away from the end of a candidate set of periodic band defects, then the candidate set of periodic band defects may not be updated. If there is a band defect approximately $2\hat{b}_p$ away from the end of a candidate set of periodic band defects, then it may be determined to update the candidate set of periodic band defects. Updating the set of periodic band defects may include adding a synthetic band that is $\Delta \hat{b}_p$ away from the end of the set of periodic bands. Updating the set of periodic band defects may also include performing a second cost function computation for the candidate set of periodic band defects using the synthetic band. For example, the cost function computation instructions 322 may be code to cause a processor to, in response to determining to update a candidate set of periodic band defects, perform a second cost function computation for the candidate set of periodic band defects using the synthetic band. For instance, the cost function (and fitting error, for example) may be re-computed for the updated candidate set of periodic band defects that includes the synthetic band.

In some examples, the candidate set determination instructions 320 may be code to cause the processor to update the candidate sets of periodic band defects in a case that the second cost function computation indicates an error reduction relative to the first cost function computation. For example, if a fitting error ($\varepsilon'_p$) from the second cost function computation is less than a fitting error ($\varepsilon_p$) from the first cost function computation (e.g., $\varepsilon'_p < \varepsilon_p$), then the candidate sets of periodic band defects may be updated. For example, a candidate set of periodic band defects may be replaced by a corresponding candidate set of periodic band defects that includes the synthetic band (e.g., a detected missing band).

In some examples, when all of the candidate sets of periodic band defects have been checked for an update (e.g., whether to add a synthetic band and update the cost function computation), a set of periodic band defects may be selected from the candidate sets of periodic band defects. For example, the (actual) set of periodic band defects ($\hat{p}$) may be selected as the candidate set of periodic band defects with a maximum number of bands (e.g., maximum p) with a fitting error less than a threshold. For example, $$\hat{p} = \arg \max_{p} \{p : \varepsilon < 5\%\}.$$

In some examples, the computer-readable medium 318 may include instructions to cause the processor to determine an impaired device component based on a selection of the candidate sets of periodic band defects. In some examples, determining the impaired device component may be performed as described in connection with FIG. 1.

FIG. 4 is a diagram of an illustrative example of an image of a printed page 424 with band defects. In the example of FIG. 4, a vertical dimension of the page 424 represents the process dimension and a horizontal dimension of the page 424 represents the scan direction. In this example, the line density on the page 424 represents degrees of banding. As described above, the image of the page 424 may be separated into multiple partitions 426a-c in some examples.

In example illustrated in FIG. 4, a profile 428 is illustrated in correspondence with the middle partition 426b. Other profiles corresponding to other partitions 426a, 426c are also shown. Thresholds 430a-b are also illustrated corresponding to the profile 428. As can be observed, peak values may correspond to band defects in some cases.

In the example illustrated in FIG. 4, several aperiodic band defects 434a-l are illustrated. A set of periodic bands 432a-d is also illustrated. In this example, a missing band 436 has occurred. In accordance with some examples of the techniques described herein, a synthetic band 438 may be inserted and the missing band 436 may be detected due to a reduction in fitting error of the cost function after inserting the synthetic band 438.

It should be noted that while various examples of systems and methods are described herein, the disclosure should not be limited to the examples. Variations of the examples described herein may be implemented within the scope of the disclosure. For example, functions, aspects, or elements of the examples described herein may be omitted or combined.

The invention claimed is:
1. A method, comprising:
   calculating a first cost function measure based on band defects in an image, wherein the image is an image of a printed page produced by a printer;

calculating a second cost function measure based on the band defects and a synthetic band; and detecting a missing band based on a comparison of the first cost function measure and the second cost function measure.

2. The method of claim 1, wherein the missing band is detected in response to determining that the second cost function measure is less than the first cost function measure.

3. The method of claim 1, further comprising:
determining a set of prospective periodic band defects based on the band defects; and
determining whether a band defect exists at two intervals away from the set of prospective periodic band defects.

4. The method of claim 3, further comprising inserting the synthetic band in response to determining that the band defect exists at two intervals away from the set of prospective periodic band defects.

5. The method of claim 1, further comprising determining an impaired device component based on the missing band.

6. The method of claim 5, wherein the impaired device component is a component of the printer.

7. The method of claim 6, wherein determining the impaired device component is based on an interval between one of the band defects and the missing band.

8. The method of claim 7, wherein determining the impaired device component comprises determining a device component corresponding to the interval.

9. The method of claim 1, further comprising initiating a corrective action based on the missing band.

10. The method of claim 9, wherein initiating the corrective action comprises indicating an impaired device component.

11. An apparatus, comprising:
a memory;
a processor coupled to the memory, wherein the processor is to:
determine a set of periodic band defects in an image based on a first cost function estimation, wherein the image is an image of a printed page produced by a printer;
insert a synthetic band in a case that there is a detected band defect at an interval multiple from the set of periodic band defects; and
determine that there is a missing band corresponding to the synthetic band based on a second cost function estimation.

12. The apparatus of claim 11, wherein the processor is to:
calculate a first fitting error from the first cost function estimation;
calculate a second fitting error from the second cost function estimation; and
compare the first fitting error to the second fitting error, wherein the missing band is determined in a case that the second fitting error is less than the first fitting error.

13. The apparatus of claim 12, wherein the processor is to identify a device component that caused the set of periodic band defects.

14. A non-transitory tangible computer-readable medium storing executable code, comprising:
code to cause a processor to determine candidate sets of periodic band defects from a set of band defects in an image based on respective first cost function computations, wherein the image is an image of a printed page produced by a printer;
code to cause the processor to, in response to determining to update a candidate set of periodic band defects, perform a second cost function computation for the candidate set of periodic band defects using a synthetic band; and
code to cause the processor to update the candidate sets of periodic band defects in a case that the second cost function computation indicates an error reduction relative to a first cost function computation.

15. The computer-readable medium of claim 14, further comprising code to cause the processor to determine an impaired device component based on a selection of the candidate sets of periodic band defects.

* * * * *